Patented Apr. 9, 1929.

1,708,252

UNITED STATES PATENT OFFICE.

SAMUEL H. BERCH, OF SEATTLE, WASHINGTON.

ART OF MANUFACTURING AN ICE-CREAM PRODUCT AND THE PRODUCT OF SAID METHOD.

No Drawing. Application filed April 28, 1925. Serial No. 26,541.

My invention relates to the art of manufacturing an ice cream product and to the product of said method.

In marketing ice cream, one of the uncertainties, which causes a great deal of difficulty, relates to the question of the packing of the ice cream. The retailer should be able to dip a given number of cones from a gallon of ice cream. However, if he is not careful in the dipping, he will obtain only about sixty-five to eighty percent of the cones per gallon of ice cream. In short, the ice cream packs and the air in a given portion is squeezed out by the dipping, so that the retailer finds that he may be making little or no profit.

On the other hand, there is a great demand for an ice cream product of the cone type. The problem is, therefore, to provide a pre-filled cone, i. e., a cone filled by the manufacturer with ice cream in the soft condition, so that a standard degree of density of ice cream is provided, and this may be readily accomplished by the manufacturer in filling the cones at the completion of the manufacture of the ice cream proper when it is soft and may be poured, i. e., when the ice cream is in the stage of manufacture known as "soft" ice cream. After the cream known as "soft" ice cream is poured, whether it be in metal containers or in pasteboard boaxes, (to provide what is known as "brick" ice cream), the ice cream is put in the freezing room and caused to be frozen solid. However, the cone made of cone cake dough after the recipes heretofore obtaining would itself absorb the moisture from the ice cream if filled with ice cream in said soft state, and would become soggy. This soggy condition would develop either at the time of the filling, if allowed to remain very long in said cone, and would surely develop before said ice cream was retailed in the period ordinarily elapsing between the time of manufacture and consumption. Thus, this development of sogginess as respects the cone presents a further difficulty.

Such a cone may be provided without making provision for a further difficulty which must be taken into account if a pre-filled cone is to be provided of the best character. The cold ice cream inside of the cone causes during the period of marketing a condensation of the moisture of the warm air immediately contacting with the exterior of the cone container. This condensation therefore renders the exterior of the cone soggy, and therefore renders the product somewhat mussy in character. A primary object of my invention is to provide a cone dough of a composition which will take this difficulty into account and afford protection against such sogginess by reason of said condensation.

A further primary object of my invention is to provide an ice cream product which will not involve a scoop. In dipping ice cream, it is obviously necessary for the retailer to use a dipper which he must plunge into water between sales, and, obviously, this dipper dripping with said water is pressed into the ice cream, and thus some of the water finds its way to the ice cream. This obviously is not a sanitary method of marketing ice cream.

Moreover, the ice cream which is used to fill the ice cream cones as at present marketed is placed in the metal cans, and these will become rusty in spots in the course of a short time. A primary object of my invention is to provide an ice cream product which will not come in contact with any container from the time of its manufacture until the time that it is consumed, other than the ultimate container which may encompass the same at the time it is consumed, thus providing a sealed package of ice cream, a product complying in every respect with the most exacting sanitary demands. There has long been a most decided demand for an ice cream "package," which will not soil the fingers, and which will otherwise comply with the requirements above set forth.

A primary object of my invention is to overcome all these difficulties and to provide a method of manufacturing an ice cream product which will not stain the fingers, and at the same time will not be disagreeable to the taste and to many people the chocolate taste is highly objectionable. The new cone embodying my invention overcomes this objection to the chocolate taste.

These objects, together with others inherent in the same, may be attained by my invention, as follows:

An ice cream cone may be first caused to be moulded and baked as a container. The form of this cone I preferably make rectangular, so as to permit of efficient packing. The inside of the cone is provided with a coating of oil, preferably cocoa butter, which is preferably sprayed upon the inside, care being taken that no oil be applied to the outside of the cone, which would obviously be liable to stain the fingers of the consumer. The cone is then filled by poring the partially frozen ice cream, i. e., the "soft" ice cream, therein. Thereupon, the filled cone, preferably wrapped in a suitable wrapper such as tin foil, is put in the freezing room, and the cream frozen solid. The ice cream, being thus exposed on the top surface, may or may not be, but preferably is, sealed with a chocolate coating. The product is then ready for packing in the containers which are placed in the ice cream tubs packed with ice and salt. Thereafter, the ice cream is delivered to the retailer, who is thus prepared to fill orders for ice cream cones without delay during a rush period or without dipping, with the unsanitary consequences set forth above.

Obviously, it is preferable to use an oil for said coating having as high a melting point as possible, and which at the same time is in no wise objectionable as rendering the cone less edible or appetizing. Cocoa butter is well suited for this purpose, as it has a melting point of about ninety-six degrees. Cocoa oil, as distinguished from cocoa butter, has a melting point of eighty-six to ninety degrees. However, cocoa oil plus other ingredients may have the melting point raised to as high as one hundred and thirty degrees. Animal grease has a low melting point, but nevertheless can be caused to be applied for the purpose herein considered, since the grease is on the inside of the cone and therefore in contact with the cold ice cream. My invention, therefore, makes use of the coldness of the ice cream in direct contact with the oil to cause the oil to function most efficiently, and makes a complete seal on the inside of the cone, thereby preventing the cone itself from becoming soggy, so far as protection on the inside is concerned.

In providing protection against the objectionable condensation on the outside of the cone of the moisture in the warm atmosphere which may come in contact during marketing with said outside surface of the cone, my invention relates to the providing of a new cone dough, which overcomes said condensation difficulty and does not become soggy, continues crisp and brittle, is of a pleasant taste, and does not soil the fingers. To this end, I provide a dough which contains an oil indifferent to moisture, or an oil which becomes more crisp and brittle by reason of said condensation. "Indifferent" is herein used to include the idea that the resulting cone dough does not become soggy, and includes the idea of being acted upon by the condensation moisture to produce a crisp and brittle cone, if such is the true action or explanation. The exact action is not at present fully understood by me, but the advantageous result is as herein set forth.

As an example of such an oil, which is indifferent to moisture, I have found that the products of the cacao plant, such as chocolate or cocoa butter, are very satisfactory. That my invention may be fully understood, I will now set forth a formula for such a cone dough as I am at present using, and find to be entirely satisfactory:

Four gallons water,
Twenty pounds flour,
Twenty-four ounces chocolate,
Forty-eight ounces sweetened cocoa butter,
Three tablespoons vegetable coloring solution,
One tablespoon salt.

The proportions in the above may be varied, but I have found the above provides a cone well satisfying the requirements herein set forth.

The cone dough thus mixed and prepared is moulded and baked in the ordinary manner, and the inside of a cone thus prepared is sprayed with the cocoa butter oil as above set forth for ordinary cone dough. The coating thus provides protection against the ice cream causing the cone to become soggy, and the composition of the cone dough provides protection against the objections of condensation hereinabove described.

Ordinarily it is the practice in providing an ice cream product to be eaten out of hand to cause the ice cream to be first frozen solid and thereafter dipped or coated by a heat insulating enveloping container; my invention, on the other hand, involves first the manufacture of an edible container, and then filling the same with the soft ice cream, which is thereupon caused to be frozen solid while in said container.

Obviously, changes may be made as respects the details of my invention without departing from the fundamental principle set forth.

I claim:

1. An ice cream cone embodying as one of the dough constituents a cocoa seed product.

2. An ice cream cone embodying as one of the dough constituents cocoa butter.

3. An ice cream cone embodying as constituents of the dough, cocoa butter and chocolate.

4. As an article of manufacture, an ice cream cone formed of dough embodying the following constituents, and such constituents in approximately the following proportions: four gallons water, twenty pounds flour, twenty-four ounces chocolate, forty-eight ounces sweetened cocoa butter, three tablespoons vegetable coloring solution, and one tablespoon salt.

5. The method of manufacturing an ice cream product, comprising baking a dough wall container embodying the following constituents,—water, flour, chocolate, cocoa butter; spraying the inside of said container with cocoa butter; filling said container with soft ice cream; subjecting said filled container to a freezing temperature, whereby is provided an ice cream product in an edible container which is protected against being soggy by reason of the coldness of the ice cream on the inside maintaining the oil coating in a hardened condition, and which is protected against becoming soggy because of the condensation of the moisture in the air by reason of the cocoa butter constituent in the dough.

In witness whereof, I hereunto subscribe my name this 23d day of April, 1925.

SAMUEL H. BERCH.